US010708849B2

(12) United States Patent
Catovic et al.

(10) Patent No.: US 10,708,849 B2
(45) Date of Patent: Jul. 7, 2020

(54) PUBLIC LAND MOBILE NETWORK (PLMN) LIST FOR EVOLVED PACKET DATA GATEWAY (EPDG) SELECTION

(71) Applicant: QUALCOMM Incorporated, San Diego, CA (US)

(72) Inventors: Amer Catovic, Carlsbad, CA (US); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 15/154,883

(22) Filed: May 13, 2016

(65) Prior Publication Data

US 2016/0337942 A1 Nov. 17, 2016

Related U.S. Application Data

(60) Provisional application No. 62/162,634, filed on May 15, 2015.

(51) Int. Cl.
*H04W 48/08* (2009.01)
*H04W 48/00* (2009.01)
(Continued)

(52) U.S. Cl.
CPC ............ *H04W 48/08* (2013.01); *H04W 12/06* (2013.01); *H04W 48/17* (2013.01); *H04W 48/20* (2013.01); *H04W 88/06* (2013.01)

(58) Field of Classification Search
CPC ...... H04W 48/08; H04W 12/06; H04W 48/20; H04W 48/17; H04W 88/06
See application file for complete search history.

(56) References Cited

U.S. PATENT DOCUMENTS

2006/0126584 A1  6/2006 Zhang et al.
2011/0261787 A1* 10/2011 Bachmann ............ H04L 63/029
                                              370/331
(Continued)

FOREIGN PATENT DOCUMENTS

CN       103533666 A    1/2014
EP         2194686 A1   6/2010

OTHER PUBLICATIONS

Blackberry UK Ltd., et al., "Clarification on Sources of PLMN IDs", 3GPP Draft; C1-151202-24302-D10-SP,3GPP, CT WG1, No. Meeting #91, Bratislava (Slovakia); Apr. 13, 2015, XP050929619, 2 pages. Retrieved from the Internet: URL: http://www.3gpp.org/ftp/Meetings_3GPP_SYNC/CT1/Docs/ [retrieved on Apr. 12, 2015].

(Continued)

*Primary Examiner* — Walter J Divito
*Assistant Examiner* — Anthony Luo
(74) *Attorney, Agent, or Firm* — Arent Fox, LLP (57) ABSTRACT

The present disclosure provides the UE with ePDG information that includes a list of networks that provide ePDG in the area where the WLAN access point is located. In an aspect, the list of networks may include a list of PLMN IDs. By receiving the ePDG information containing the list of networks that provide ePDG in the area where the WLAN access point is located, the UE may be prevented from selecting an incorrect ePDG. In aspects of the disclosure, a method, an apparatus, and a computer-readable medium for wireless communication are provided. In one aspect, the apparatus associates with an access point of a wireless communication network. In another aspect, the apparatus receives, from the access point, ePDG information comprising a list of networks that provide ePDGs in an area of the access point. In a further aspect, the apparatus selects an ePDG based on the ePDG information.

20 Claims, 9 Drawing Sheets

(51) Int. Cl.
H04W 12/06 (2009.01)
H04W 48/20 (2009.01)
H04W 88/00 (2009.01)
H04W 88/06 (2009.01)

(56) References Cited

U.S. PATENT DOCUMENTS

| | | |
|---|---|---|
| 2012/0204253 A1 | 8/2012 | Sugimoto et al. |
| 2013/0114432 A1* | 5/2013 | Haynes ............... H04W 76/041 370/252 |
| 2013/0114463 A1* | 5/2013 | Li ........................ H04W 48/18 370/254 |
| 2014/0101726 A1* | 4/2014 | Gupta ................ H04N 21/2365 726/4 |
| 2014/0153559 A1 | 6/2014 | Roeland |
| 2014/0169269 A1* | 6/2014 | Salot .................... H04W 48/20 370/328 |
| 2014/0177523 A1* | 6/2014 | Chang .................. H04W 48/17 370/328 |
| 2014/0295913 A1* | 10/2014 | Gupta ............... H04W 72/0413 455/552.1 |
| 2016/0226981 A1* | 8/2016 | McCann ............... H04L 67/146 |
| 2016/0261430 A1* | 9/2016 | Lepp ................... H04L 12/4641 |

OTHER PUBLICATIONS

International Search Report and Written Opinion—PCT/US2016/032575—ISA/EPO—dated Jul. 5, 2016.

* cited by examiner

PUBLIC LAND MOBILE NETWORK (PLMN) LIST FOR EVOLVED PACKET DATA GATEWAY (EPDG) SELECTION

CROSS-REFERENCE TO RELATED APPLICATION(S)

This application claims the benefit of U.S. Provisional Application Ser. No. 62/162,634, entitled "PUBLIC LAND MOBILE NETWORK (PLMN) LIST FOR EVOLVED PACKET DATA GATEWAY (ePDG) Selection" and filed on May 15, 2015, which is expressly incorporated by reference herein in its entirety.

BACKGROUND

Field

The present disclosure relates generally to communication systems, and more particularly, to ePDG selection.

Background

A user equipment (UE) (e.g., a mobile device) connected to a wireless local area network (WLAN) may gain internet protocol (IP) connectivity via an operator's (e.g., AT&T, Verizon, Sprint, etc.) core evolved packet core (EPC) network. A packet data network gateway (PDN-GW) may be the IP anchor in the operator's network. The WLAN to which the UE connects may be trusted or untrusted. If the WLAN is untrusted the UE may need to connect to an ePDG entity before gaining access to the PDN-GW. Once the UE selects an ePDG using ePDG selection procedures, the UE may set up an IPSec tunnel to the ePDG for secure connection to the EPC. In an aspect, assistance information for ePDG selection may be pre-configured in the UE. For example, the home operator (e.g., AT&T, Verizon, Sprint, etc.) may pre-configure a fully qualified domain name (FQDN) or IP address of the ePDG for use by the UE in a specific network. However, pre-configuration may not be practical or feasible in all scenarios. For example, when the UE is in a network for which there is no pre-configured ePDG (e.g., when the UE is roaming in another country), or an operator/network has a large number of ePDGs deployed so that the location of the UE needs to be taken into consideration before selecting an ePDG. Thus, there is a need for a UE to be able to select an ePDG when ePDG pre-configuration is not practical or feasible.

SUMMARY

Although a UE may be authenticated and/or authorized to access the WLAN by a network/service provider (SP) based on the authentication information received from the WLAN, this does not necessarily mean that each network/SP in the list of authentication information has an ePDG deployed in the area in which the UE and the WLAN access point are located. For example, the UE may be a subscriber of U.S. operator A, but the UE is currently roaming in a European country X. The U.S. operator A may have a roaming agreement with a European operator B covering all countries in Europe meaning that the UE may be authenticated/authorized by operator B (e.g., on behalf of U.S. operator A). The WLAN that the UE wants to access in country X communicates to the UE, via a 3GPP Cellular Network access network query protocol (ANQP) element, the network identity of the operator B indicating that the UE may get authenticated/authorized for WLAN access by operator B. However, operator B may not have an ePDG deployed in country X. As a result, the UE will select an ePDG of operator B but will either fail in trying to contact the ePDG of the operator B or get connected to an ePDG of operator B located in a different country which may result in poor connectivity to the PDN or may be prohibited by local regulations. Thus, the UE may not want to rely on the PLMN list (e.g., authentication information) provided via ANQP by the WLAN for ePDG selection.

The present disclosure provides a solution to this problem by providing the UE with ePDG information that includes a list of networks that provide ePDG in the area where the WLAN access point is located. In an aspect, the list of networks may include a list of PLMN IDs. The list included in the ePDG information may be a PLMN list for ePDG selection and/or PLMN list with S2b connectivity. For example, the ePDG information may be added to the payload of the ANQP-element that includes the authentication information, and the UE may select an ePDG from the list included in the ePDG information. By receiving the ePDG information containing the list of networks that provide ePDG in the area where the WLAN access point is located, the UE may be prevented from selecting a nonexistent or an incorrect ePDG.

In aspects of the disclosure, a method, an apparatus, and a computer-readable medium for wireless communication are provided. The apparatus may associate with an access point of a wireless communication network. The apparatus may also receive, from the access point, ePDG information comprising a list of networks that provide ePDGs in an area of the access point. The apparatus may additionally select an ePDG based on the ePDG information.

In another aspect, the apparatus may associate with a UE. The apparatus may also transmit, from an access point, ePDG information comprising a list of networks that provide ePDGs in an area of the access point.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Figure 1:
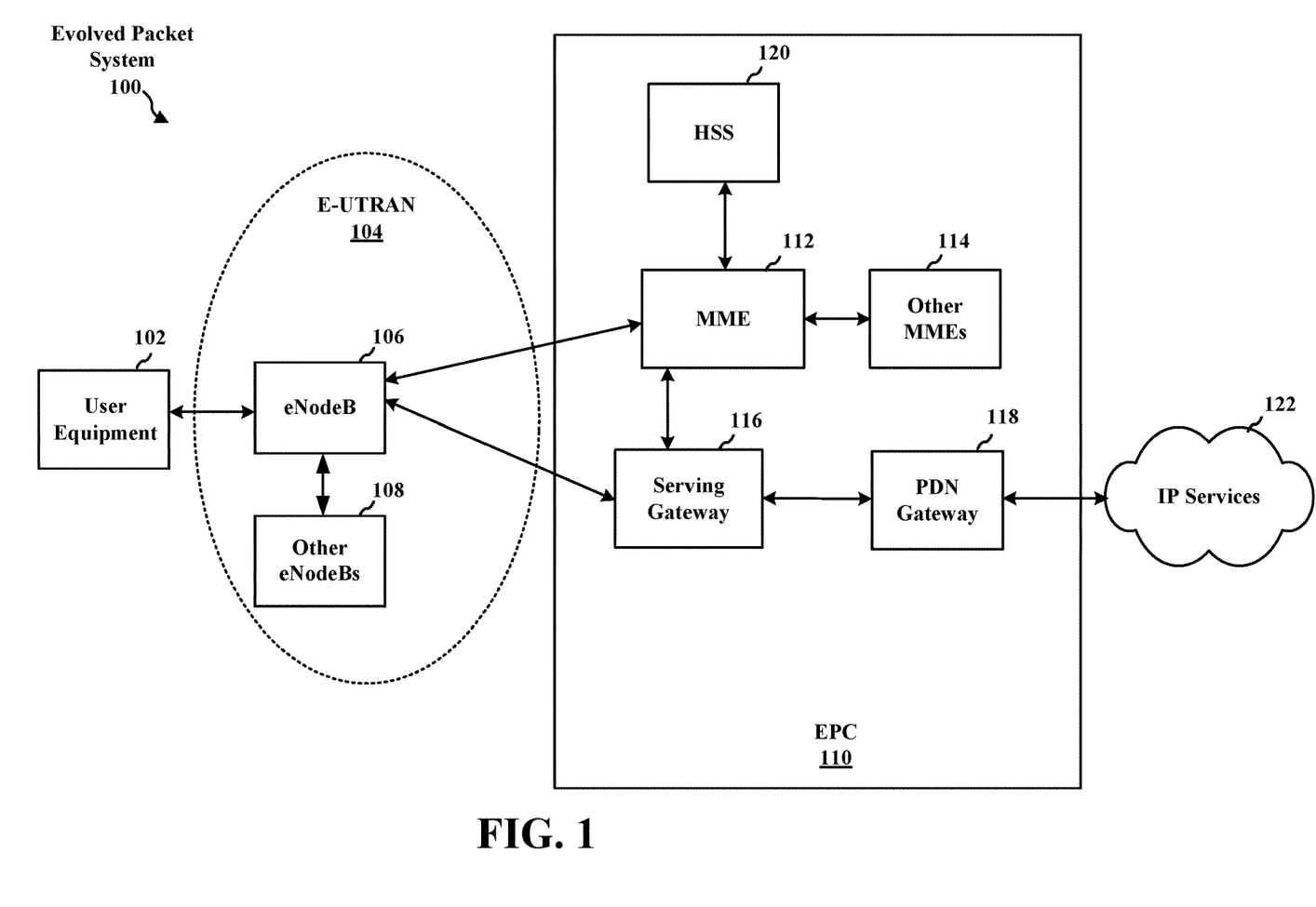
FIG. 1 is a diagram illustrating an example of a network architecture.

FIG. 1 is a diagram illustrating a long term evolution (LTE) network architecture 100. The LTE network architecture 100 may be referred to as an EPS 100. The EPS 100 may include one or more user equipment (UE) 102, an Evolved Universal mobile Telecommunications System (UMTS) Terrestrial Radio Access Network (E-UTRAN) 104, an Evolved Packet Core (EPC) 110, and an Operator's IP Services 122. The EPS can interconnect with other access networks, but for simplicity those entities/interfaces are not shown. As shown, the EPS 100 provides packet-switched services, however, as those skilled in the art will readily appreciate, the various concepts presented throughout this disclosure may be extended to networks providing circuit-switched services.

The E-UTRAN 104 includes the evolved Node B (eNodeB or eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. The HSS 120 is a master user database that supports the network entities that actually handle calls. In addition, the HSS 120 may contain the subscription-related information (e.g., subscriber profiles), perform authentication and authorization of the user, and provide information about the subscriber's location and IP information. All user IP packets are transferred through the Serving Gateway 116, which itself is connected to the PDN Gateway 118. The PDN Gateway 118 provides UE IP address allocation as well as other functions. The PDN Gateway 118 is connected to the IP Services 122. The IP Services 122 may include the Internet, an intranet, an IP Multimedia Subsystem (IMS), a PS Streaming Service (PSS), and/or other IP services.

Figure 2A:
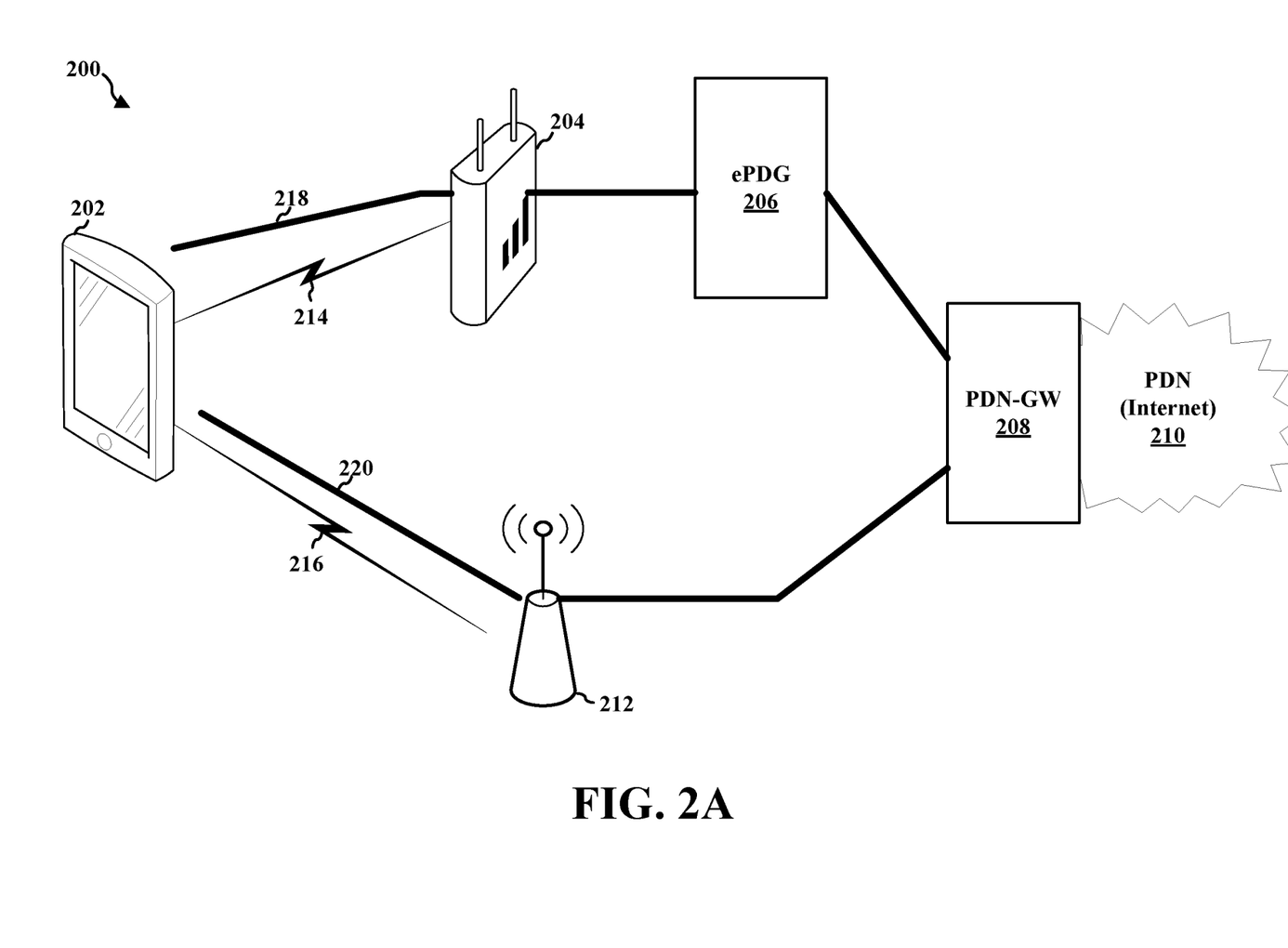
FIG. 2A is a diagram illustrating an example of an evolved packet system (EPS) in which a device gains IP connectivity via an ePDG in accordance with one aspect of the disclosure.
Figure 2B:
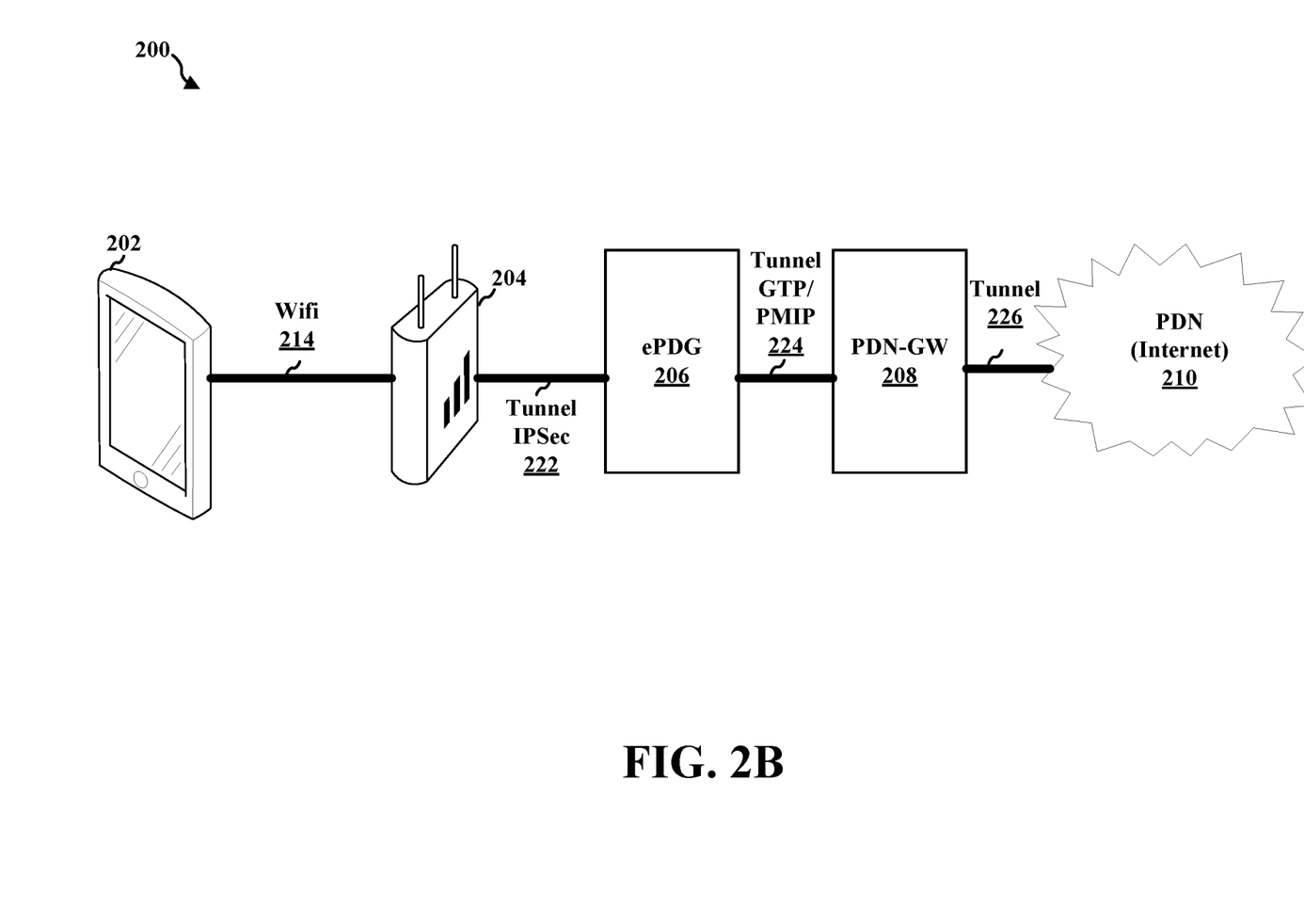
FIG. 2B is a diagram illustrating an example of an EPS in which a device gains IP connectivity via an ePDG in accordance with one aspect of the disclosure.

FIGS. 2A and 2B illustrates an EPS 200 in which a UE 202 may connect to a PDN 210 via a PDN-GW 208 by setting up a tunnel 218 that may include a wi-fi connection 214, an internet security (IPsec) tunnel 222 with an ePDG 206, a general packet radio service tunneling protocol (GTP)/proxy mobility IPv6 (PMIP) 224, and a tunnel 226 to the PDN 210. For example, GTP/PMIP may be a group of IP-based communications protocols used to carry general packet radio service (GPRS) within various communication networks. FIG. 2A also illustrates the UE 202 communicating via LTE wireless communications 216 with the base eNB 212 to set up a connection 220 with the PDN 210 via the base eNB 212.

Referring to FIGS. 2A and 2B, a UE 202 that is within range of a WLAN access point 204 may receive information via the wi-fi connection 214 from the WLAN that may be used by the UE 202 to connect to the WLAN. In an aspect, the information may be broadcast by the WLAN access point 204. For example, using ANQP (e.g., ANQP-element that includes a payload), an untrusted WLAN may communicate to the UE authentication information that includes a list of network identities (PLMN IDs) or SP realms that interwork with the WLAN. In an aspect, a WLAN interworking with a network/SP may indicate that the UE may be authenticated and authorized to access the WLAN and obtain IP connectivity from the WLAN by that network/SP (e.g., using credentials stored in the subscriber identity module (SIM) card/universal subscriber identity module (USIM)).

A UE 202 (e.g., a mobile device) connected to a WLAN may gain IP connectivity via an operator's (e.g., AT&T, Verizon, Sprint, etc.) core EPC network. A PDN-GW 208 may be the IP anchor in the operator's network. The WLAN to which the UE 202 connects may be trusted or untrusted. If the WLAN access point 204 is untrusted the UE 202 may need to connect to an ePDG 206 before gaining access to the PDN-GW 208. Once the UE selects an ePDG 206 using ePDG selection procedures, the UE 202 may set up IPSec tunnel 218 to the ePDG 206 for secure connection to the EPC. In an aspect, assistance information for ePDG selection may be pre-configured in the UE 202. For example, the home operator (e.g., AT&T, Verizon, Sprint, etc.) may pre-configure a FQDN or IP address of the ePDG 206 for use by the UE 202 in a specific network. However, pre-configuration may not be practical or feasible in all scenarios. For example, the UE 202 may be in a network for which there is no pre-configured ePDG 206 (e.g., when the UE 202 is roaming in another country), or an operator/network may have a large number of ePDGs deployed so the location of the UE 202 may need to be taken into consideration before selecting an ePDG 206. Thus, the UE 202 may need to dynamically select an ePDG 206.

Although a UE 202 may be authenticated and/or authorized to access the WLAN access point 204 by a network/SP based on the authentication information received from the WLAN access point 204, this does not necessarily mean that each network/SP in the list (e.g., authentication information) has an ePDG 206 deployed in the area where the UE 202 and the WLAN access point 204 are located. For example, the UE 202 may be a subscriber of U.S. operator A currently roaming in a European country X.

The operator A may have a roaming agreement with a European operator B covering all countries in Europe meaning that the UE 202 may be authenticated/authorized by operator B (e.g., on behalf of operator A). The WLAN that the UE 202 wants to access in country X communicates to the UE 202, via a 3GPP Cellular Network ANQP-element, the network identity of the operator B indicating that the UE 202 may be authenticated/authorized for WLAN access by operator B.

However, operator B may not have an ePDG 206 deployed in country X. As a result, the UE 202 may select an ePDG of operator B but will either fail in trying to contact the ePDG of the operator B or get connected to an ePDG 206 of operator B located in a different country which may result in poor connectivity to the PDN 210 or may be prohibited by local regulations. Thus, the UE 202 may not rely on the PLMN list (e.g., authentication information) provided via ANQP by the WLAN access point 204 for ePDG selection.

Thus, in an aspect, the UE 202 may receive ePDG information that includes a list of networks (e.g., PLMN IDs) that provide ePDG 206 in the area where the WLAN access point 204 is located. The list included in the ePDG information may be a PLMN list for ePDG selection and/or PLMN list with S2b connectivity. For example, the ePDG information may be added to the payload of the ANQP-element that includes the authentication information, and the UE 202 may select an ePDG 206 from the list included in the ePDG information. By receiving the ePDG information containing the list of networks (e.g., PLMN IDs) that provide an ePDG 206 in the area where the WLAN access point 204 is located, the UE 202 may be prevented from selecting an inexistent or an incorrect ePDG.

To access a selected ePDG 206, the UE 202 may construct a FQDN using, for example, a home public land mobile network identification (HPLMN ID) or a visited public land mobile network identification (VPLMN ID) as the operator identifier and obtain the IP address(es) of the ePDG(s) from the ePDG list (e.g., ePDG information) received from the WLAN access point 204. The ePDG FQDN may contain an operator identifier that uniquely identifies the PLMN where the ePDG 206 is located. For example, the ePDG FQDN may be composed of seven labels. The last three labels may be "pub.3gppnetwork.org". The third and fourth labels together may uniquely identify the PLMN. The first two labels may be "epdg.epc". The result of the ePDG FQDN may be:

"epdg.epc.mnc<MNC>.mcc<MCC>.pub.3gppnetwork.org"

In the roaming case, the UE 202 may utilize the services of the VPLMN. In this case, the ePDG FQDN Operator Identifier may be constructed as described above, but using the mobile network code (MNC) and mobile country code (MCC) of the VPLMN.

In order to provide inter-PLMN domain name system (DNS) translation, the <MNC> and <MCC> coding used in the "epdg.epc.mnc<MNC>.mcc<MCC>.pub.3gppnetwork.org" format of the ePDG FQDN Operator Identifier may be <MNC>=3 digits and <MCC>=3 digits.

If there are only 2 significant digits in the MNC, one "0" digit shall be inserted at the left side to fill the 3 digits coding of MNC in the ePDG FQDN.

As an example, the ePDG FQDN Operator Identifier for MCC 345 and MNC 12 is coded in the DNS as "epdg.epc.mnc012.mcc345.pub.3gppnetwork.org".

Thus, the present disclosure provides a method for the WLAN to assist the UE 202 in selecting the ePDG 206 by providing ePDG-specific information to the UE 202 via ANQP. For example, the ePDG information comprises the list of networks identities (e.g., PLMN IDs) that provide an ePDG 206 in the area associated with the WLAN that may be selected by the UE 202. In addition, the present disclosure provides a method for the UE 202 to select an ePDG 206 by taking into consideration the ePDG-specific information provided by WLAN access point 204. For example, the UE 202 may select an ePDG 206 provided by a network in the area associated with the WLAN access point 204 if the identity of the network is provided in the ePDG information. For example, the ePDG 206 may be included in a format of the ANQP-element comprising ePDG information. The ANQP-element being transmitted from the WLAN to the UE 202.

Figure 3:
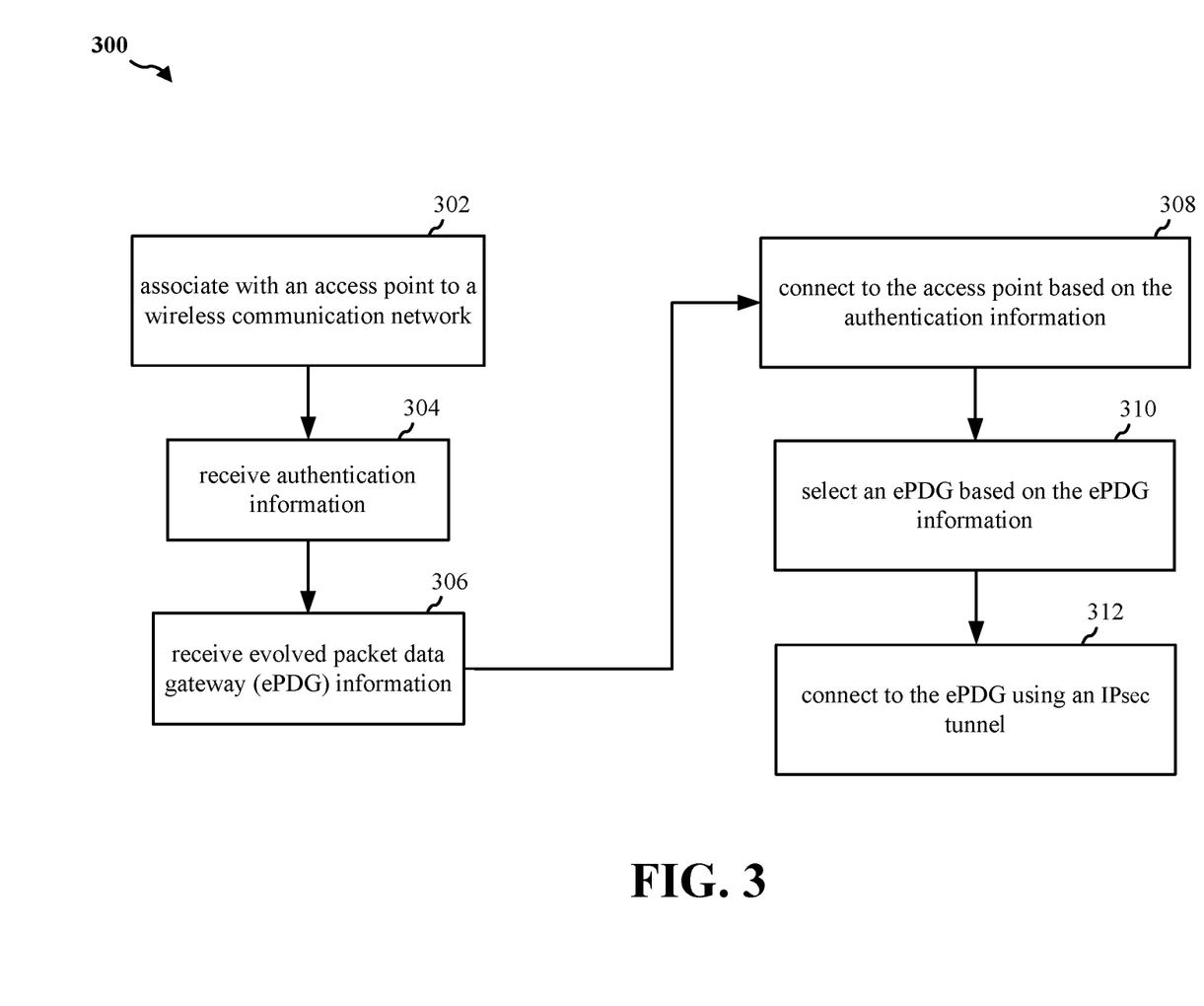
FIG. 3 is a flowchart of a method of wireless communication.

FIG. 3 is a flowchart 300 of a method of wireless communication. The method may be performed by a UE (e.g., UE 102, 202, 402/402').

At step 302, the UE may associate with an access point of a wireless communication network. For example, the UE may associate with an untrusted Non-3GPP IP access point such as a WLAN access point.

At step 304, the UE may receive authentication information from the access point. For example, the authentication information may include a list of networks (e.g., PLMN IDs)

that may authenticate with the access point. In an aspect, the UE may request the authentication information from the access point, and receive the authentication information in response to the request. Alternatively, the authentication information may be broadcast by the WLAN access point.

At step 306, the UE may receive evolved packet data gateway (ePDG) information from the access point. For example, the ePDG information may include a list of networks (e.g., PLMN IDs) that provide ePDGs in an area associated with the access point. In an aspect, the UE may request the ePDG information from the WLAN, and receive the ePDG information in response to the request. Alternatively, the ePDG information may be broadcast by the WLAN access point.

For example, the UE may request the authentication information and the ePDG information in an ANQP request that is transmitted to the access point. In an aspect, the UE may receive both the authentication information and the ePDG information in an ANQP-element transmitted by the access point. For example, the authentication information and the ePDG information may be received in the same ANQP-element.

At step 308, the UE may connect to the access point based on the authentication information. For example, if the network identity of the UE is found in the authentication information, the UE may authenticate with the WLAN access point which allows the UE to connect to the WLAN access point. Once authenticated, the UE may receive an IP address from the WLAN access point.

At step 310, the UE may select an ePDG based on the ePDG information. For example, if the ePDG information includes an ePDG that is provided by the service provider of the UE in the area associated with the access point, then the UE may select this ePDG.

At step 312, the UE may connect to the selected ePDG using an IPsec tunnel for a secure connection to the EPC.

Figure 4:
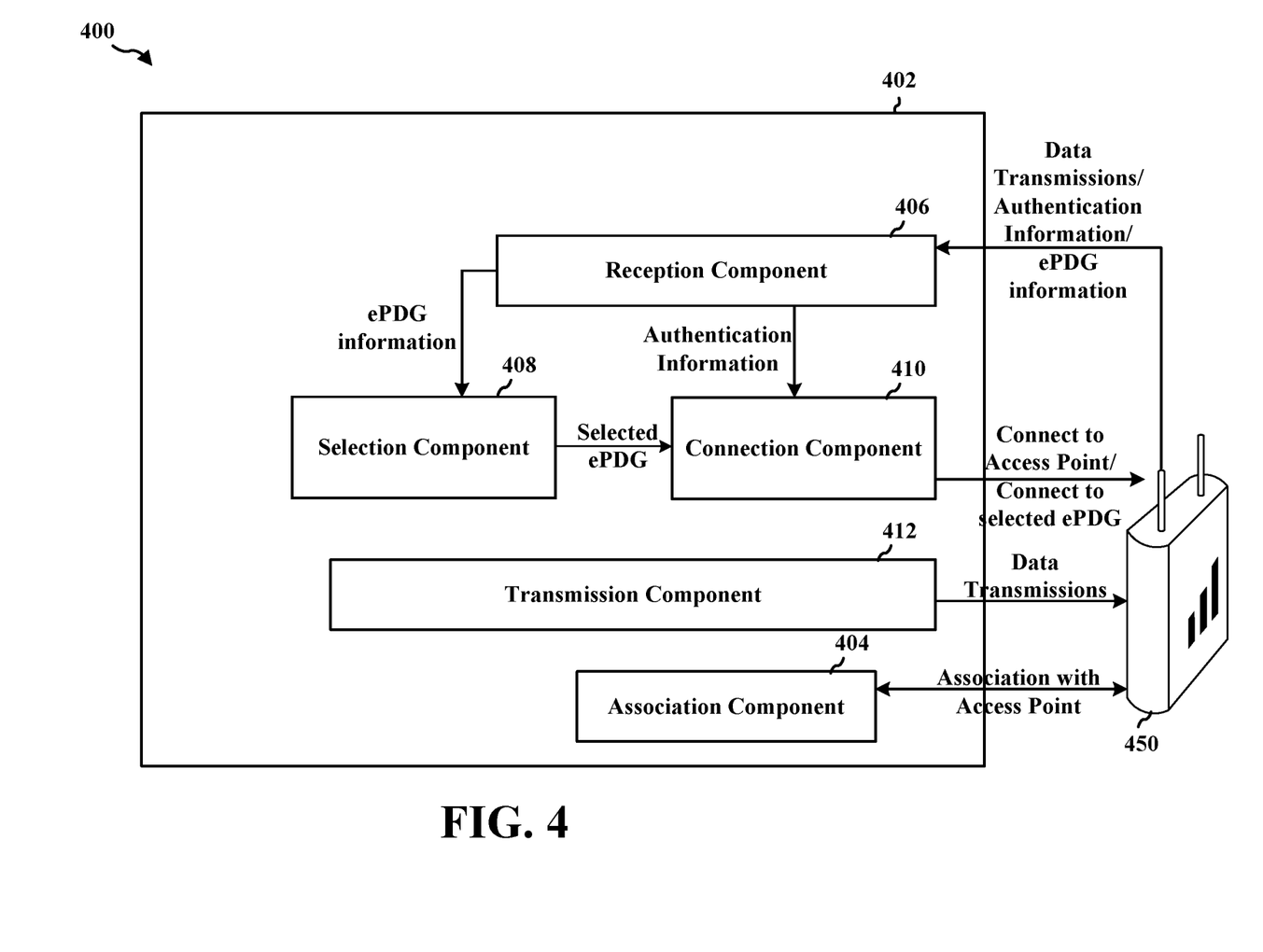
FIG. 4 is a conceptual data flow diagram illustrating the data flow between different means/components in an exemplary apparatus.

FIG. 4 is a conceptual data flow diagram 400 illustrating the data flow between different means/components in an exemplary apparatus 402. The apparatus may be a UE. The apparatus includes an association component 404 that associates with an access point 450. The apparatus also includes a reception component 406 that receives data transmissions, authentication information, and/or ePDG information from the access point 450. The apparatus also includes connection component 410 that connects to the access point using authentication information received from the reception component 406. The apparatus further includes a selection component 408 that selects an ePDG based on ePDG information received from the reception component 406. The apparatus also includes a transmission component 412 that sends data transmissions to the access point.

The apparatus may include additional components that perform each of the blocks of the algorithm in the aforementioned flowchart of FIG. 3. As such, each block in the aforementioned flowchart of FIG. 3 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 5:
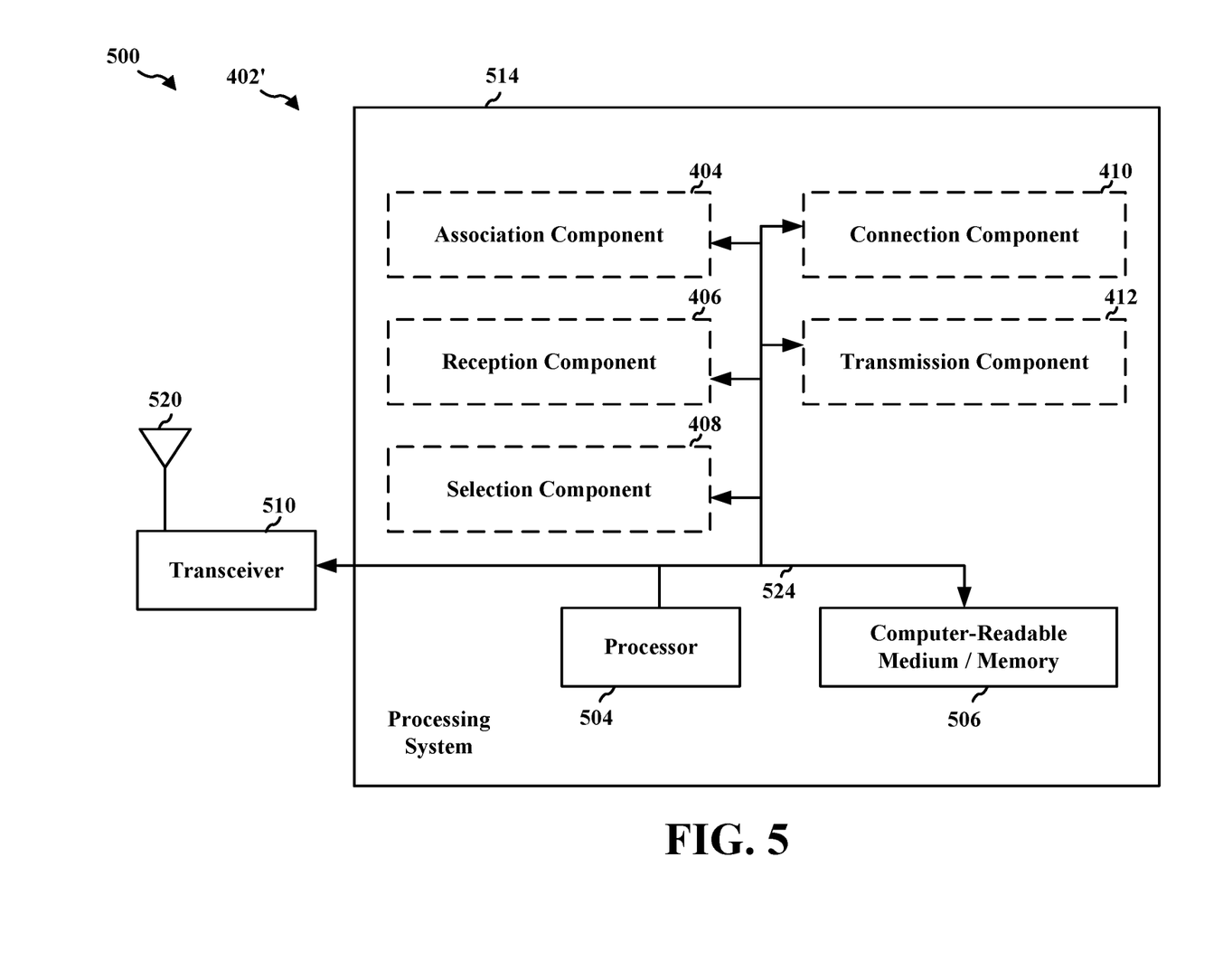
FIG. 5 is a diagram illustrating an example of a hardware implementation for an apparatus employing a processing system.

FIG. 5 is a diagram 500 illustrating an example of a hardware implementation for an apparatus 402' employing a processing system 514. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the components 404, 406, 408, 410, 412 and the computer-readable medium/memory 506. The bus 524 may also link various other circuits such as timing sources, peripherals, voltage regulators, and power management circuits, which are well known in the art, and therefore, will not be described any further.

The processing system 514 may be coupled to a transceiver 510. The transceiver 510 is coupled to one or more antennas 520. The transceiver 510 provides a means for communicating with various other apparatus over a transmission medium. The transceiver 510 receives a signal from the one or more antennas 520, extracts information from the received signal, and provides the extracted information to the processing system 514, specifically the reception component 406. In addition, the transceiver 510 receives information from the processing system 514, specifically the transmission component 412, and based on the received information, generates a signal to be applied to the one or more antennas 520. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the components 404, 406, 408, 410, 412. The components may be software components running in the processor 504, resident/stored in the computer readable medium/memory 506, one or more hardware components coupled to the processor 504, or some combination thereof. The processing system 514 may be a component of the UE 202 and may include a memory and/or at least one of a transmission processor, a receiver processor, and a controller/processor.

In one configuration, the apparatus 402/402' for wireless communication includes means for associating with an access point of a wireless communication network. In another configuration, the apparatus 402/402' for wireless communication includes means for receiving, from the access point, ePDG information comprising a list of networks that provide ePDGs in an area of the access point. In a further configuration, the apparatus 402/402' for wireless communication includes means for selecting an ePDG based on the ePDG information. In a further aspect, the ePDG information may further comprise a list of network identities. In yet another configuration, the apparatus 402/402' for wireless communication includes means for receiving authentication information comprising a list of networks that interwork with the access point. In still another configuration, the apparatus 402/402' for wireless communication includes means for connecting to the access point. In another aspect, the ePDG information may further comprise authentication information that includes a list of networks that interwork with the access point. In another configuration, the apparatus 402/402' for wireless communication includes means for connecting to the access point. In still a further configuration, the apparatus 402/402' for wireless communication includes means for requesting the authentication information. In another configuration, the apparatus 402/402' for wireless communication includes means for requesting the ePDG information. In an aspect, the authentication information and the ePDG information are received in an ANQP element transmitted by the access point. In another configuration, the apparatus 402/402' for wireless communication includes means for connecting to the ePDG. In an aspect, the means for connecting to the ePDG is configured to establish an IPSec tunnel with the ePDG. In an aspect, the non-3GPP access network is a WLAN. In another aspect, the WLAN is an untrusted WLAN. In yet another aspect, the non-3GPP access network is an untrusted non-3GPP access network. The aforementioned means may be one or more of the aforementioned components of the apparatus 402 and/or the processing system 514 of the apparatus 402' configured to perform the functions recited by the aforementioned means. As described supra, the processing system 514 may include a transmission processor, the receiver processor, and a controller/processor. As such, in one configuration, the aforementioned means may be the transmission processor, the receiver processor, and the controller/processor configured to perform the functions recited by the aforementioned means.

Figure 6:
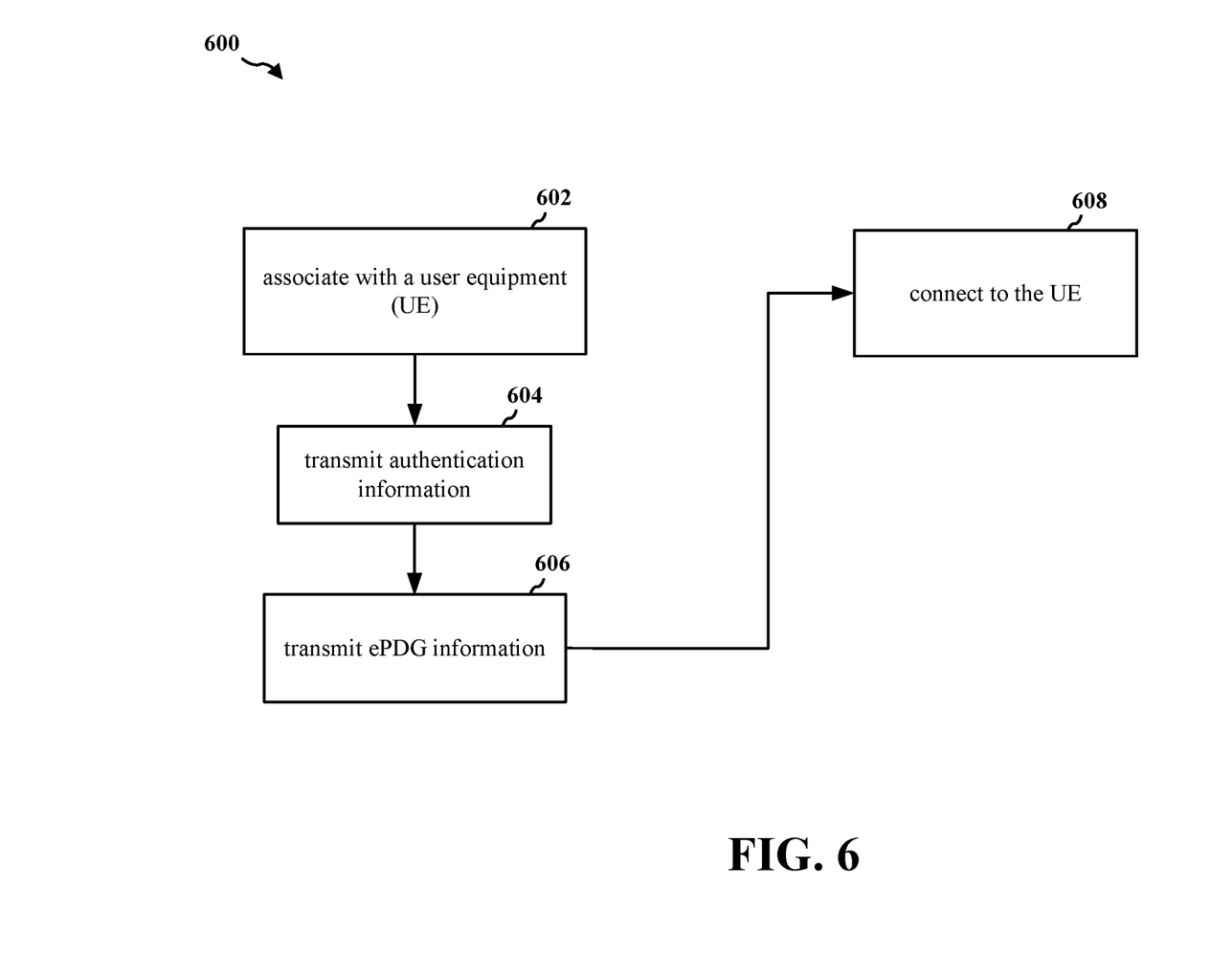
FIG. 6 is a flowchart of a method of wireless communication.

FIG. 6 is a flowchart 600 of a method of wireless communication. The method may be performed by an access point (e.g., access point 204, 702/702'). For example, the access point may be an untrusted non-3GPP IP access point.

At step 602, the access point may associate with a UE that is within range of the access point.

At step 604, the access point may transmit authentication information to the UE. For example, the authentication information may include a list of networks (e.g., PLMN IDs) that are authorized to authenticate with the access point. In an aspect, the access point may receive a request for the authentication information from the UE, and the access point may transmit the authentication information in response to the request. Alternatively, the access point may broadcast the authentication information.

At step 606, the access point may transmit ePDG information to the UE. For example, the ePDG information may include a list of network identities (e.g., PLMN IDs) that provide ePDGs in an area associated with the access point. In an aspect, the access point may receive a request for the ePDG information from the UE, and the access point may transmit the ePDG information to the UE in response to the request. Alternatively, the access point may broadcast the ePDG information.

For example, the UE may request the authentication information and the ePDG information in a native query protocol (NQP) request transmitted to the access point. In an aspect, the access point may transmit both the authentication information and the ePDG information in an ANQP-element to the UE. For example, the authentication information and the ePDG information may be transmitted in the same ANQP-element.

At step 608, the access point may connect with the UE. For example, if the network identity of the UE is in the authentication information, the UE may authenticate with the access point which allows the UE to connect to the access point. Once authenticated, the access point may transmit an IP address from the UE.

Figure 7:
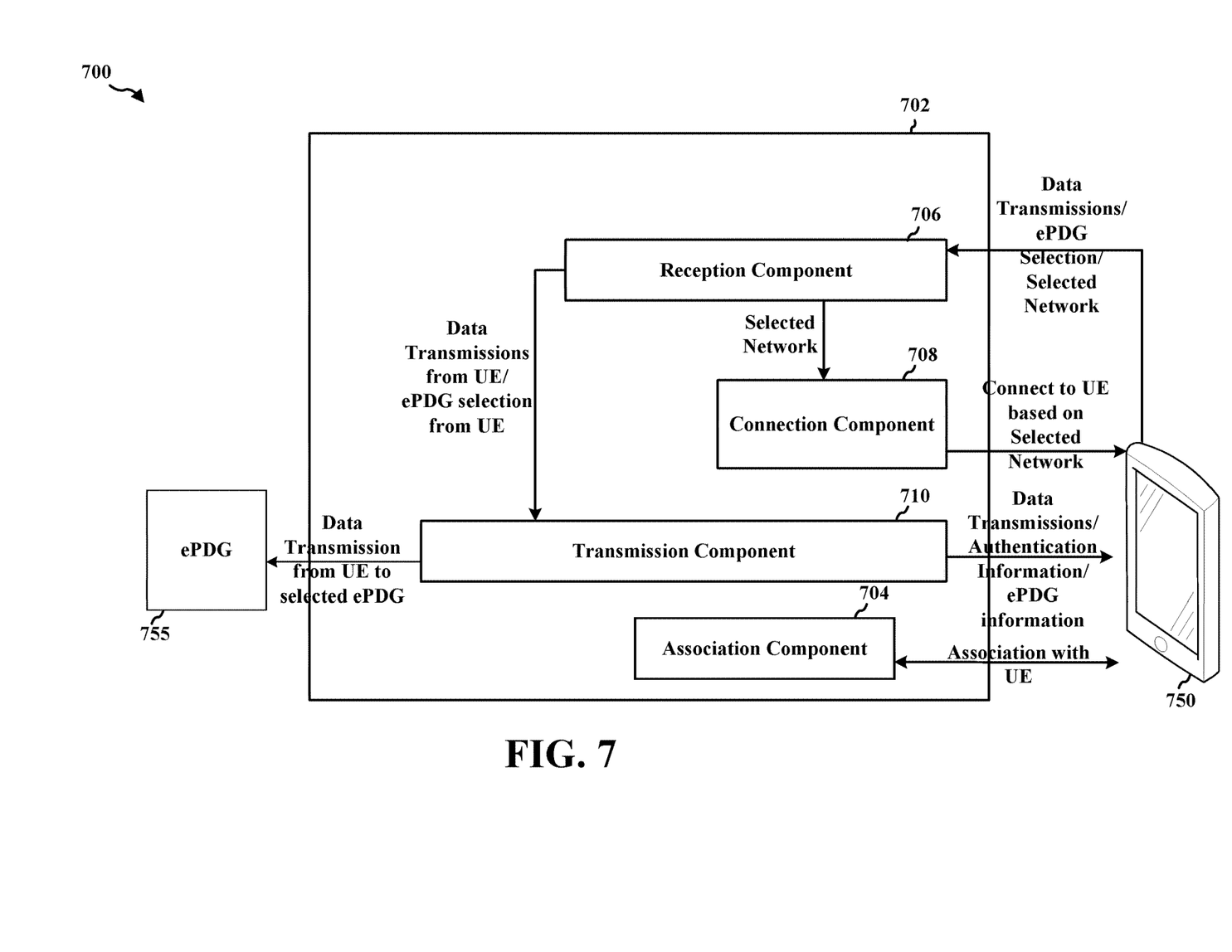
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus 702 may be an access point. The apparatus 702 includes an association component 704 that associates with a UE 750. The apparatus 702 also includes a reception component 706 that receives data transmissions, ePDG selection information, and selected network information from the UE 750. The apparatus 702 also includes a connection component 708 that connects to the UE 750 based on the selected network information received from the reception component 706. The apparatus 702 also includes a transmission component 710 that transmits data, authentication information, and/or ePDG information to the UE 750. In addition, the transmission component 710 transmits data received from the UE 750 to an ePDG 755 based on ePDG selection information and/or data transmissions received from the reception component 706.

The apparatus 702 may include additional components that perform each of the blocks in the aforementioned flowchart of FIG. 6. As such, each block in the aforementioned flowchart of FIG. 6 may be performed by one or more component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
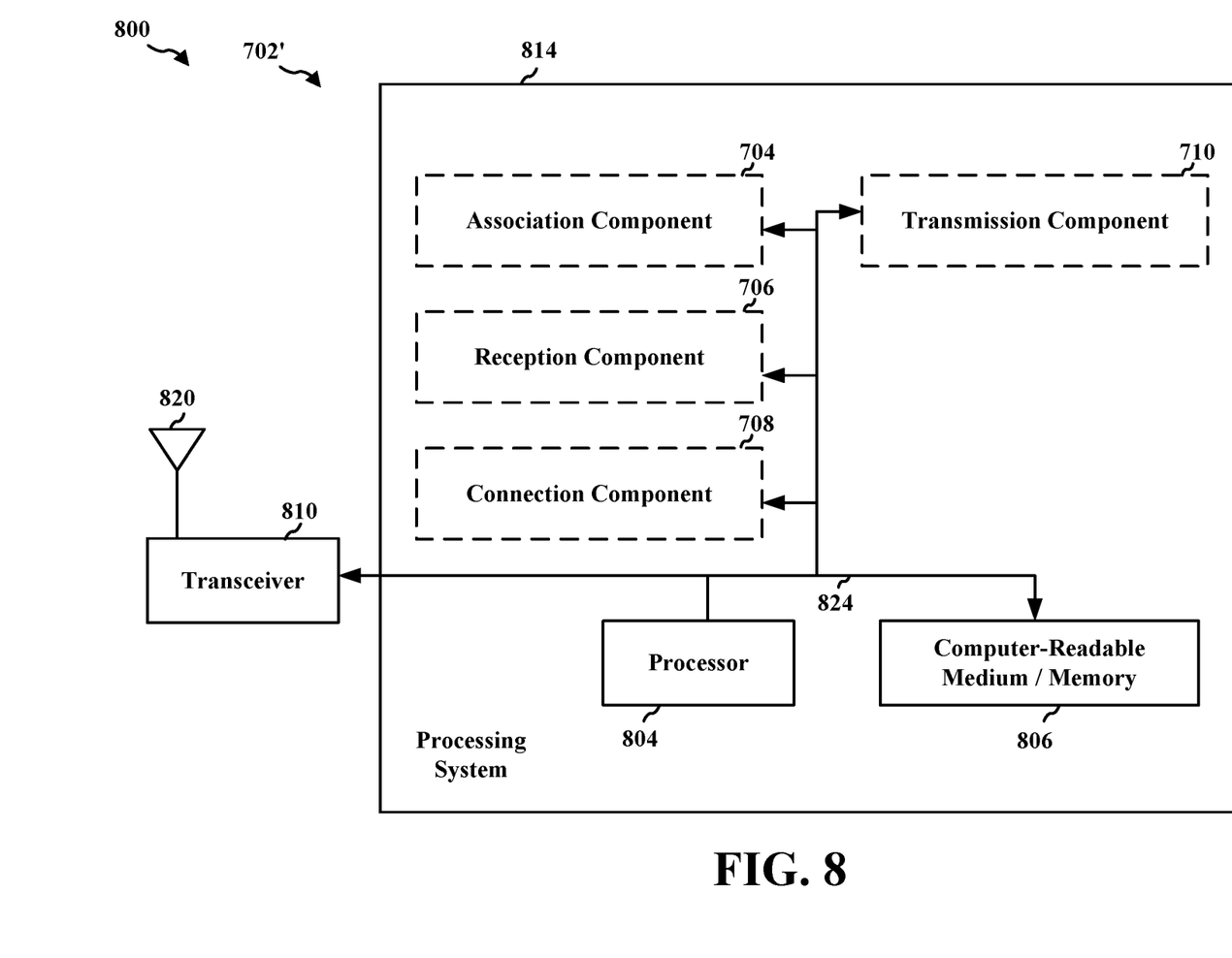
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 706. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710. The components may be software components running in the processor 804, resident/stored in the computer readable medium/memory 806, one or more hardware components coupled to the processor 804, or some combination thereof. The processing system 814 may be a component of the access point 204 and may include a memory and/or at least one of a transmission processor, a receiver processor, and a controller/processor.

In one configuration, the apparatus 702/702' for wireless communication includes means for associating with a UE. In another configuration, the apparatus 702/702' for wireless communication includes means for transmitting, from an access point, ePDG information comprising a list of networks that provide ePDGs in an area of the access point. In an aspect, the ePDG information includes a list of network identities. In yet another configuration, the apparatus 702/702' for wireless communication includes means for transmitting authentication information comprising a list of networks that can authenticate with the access point. In a further configuration, the apparatus 702/702' for wireless communication includes means for connecting to the UE. In an aspect, the ePDG information further comprises authentication information that includes a list of networks that interwork with the access point. In still another configuration, the apparatus 702/702' for wireless communication includes means for connecting to the UE. In yet another configuration, the apparatus 702/702' for wireless communication includes means for receiving a request for the authentication information. In another configuration, the apparatus 702/702' for wireless communication includes means for receiving a request for the ePDG information. In another aspect, the request for the authentication information and the ePDG information are received in an ANQP request. In a further aspect, the authentication information and the ePDG information are transmitted in an ANQP element. In still another aspect, the wireless communication network is a non-3GPP access network. In a further aspect, the non-3GPP access network is a WLAN. In a further aspect, the WLAN is an untrusted WLAN. In still another aspect, the non-3GPP access network is an untrusted non-3GPP access network. The aforementioned means may be one or more of the aforementioned components of the apparatus 702 and/or the processing system 814 of the apparatus 702' configured to perform the functions recited by the aforementioned means. As described supra, the processing system 814 may include the transmission processor, the receiver processor, and the controller/processor. As such, in one configuration, the aforementioned means may be the transmission processor, the receiver processor, and the controller/processor configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    associating with an access point of a wireless communication network; wherein the wireless communication network is an untrusted wireless local area network (WLAN);
    requesting, from the access point, authentication information and evolved packet data gateway (ePDG) information, wherein the authentication information and the ePDG information are requested in an access network query protocol (ANQP) request;
    receiving the authentication information comprising a list of networks that interwork with the access point;
    receiving, from the access point, the ePDG information comprising a list of networks that provide ePDGs in an area of the access point, wherein the ePDG information and the authentication information are received from the access point in a same ANQP element;
    connecting to the access point based on the authentication information; and
    selecting an ePDG based on the ePDG information.

2. The method of claim 1, wherein the ePDG information further comprises a list of network identities.

3. The method of claim 1, wherein the ePDG information further comprises authentication information that includes a list of network identities that interwork with the access point, the method further comprising:
    connecting to the access point.

4. The method of claim 1, wherein the authentication information is received in the ANQP element transmitted by the access point.

5. The method of claim 1, further comprising connecting to the ePDG.

6. The method of claim 5, wherein the connecting to the ePDG comprises establishing Internet Protocol Security (IPSec) tunnel with the ePDG.

7. The method of claim 1, wherein the wireless communication network is a non-3rdGeneration Partnership Project (3GPP) access network.

8. The method of claim 7, wherein the non-3GPP access network is a WLAN.

9. The method of claim 7, wherein the non-3 GPP access network is an untrusted non-3GPP access network.

10. A method of wireless communication, comprising:
    associating with a user equipment (UE);

receiving a request for authentication information and evolved packet data gateway (ePDG) information, wherein the request for the authentication information and the ePDG information are received in an access network query protocol (ANQP) request;

transmitting the authentication information comprising a list of networks that can authenticate with the access point;

transmitting, from an access point of a wireless communication network, the ePDG information comprising a list of networks that provide ePDGs in an area of the access point, wherein the ePDG information and the authentication information are transmitted from the access point in a same ANQP element; and connecting to the UE;

wherein the wireless communication network is an untrusted wireless local area network (WLAN).

11. The method of claim 10, wherein the ePDG information includes a list of network identities.

12. The method of claim 10, wherein the ePDG information further comprises authentication information that includes a list of networks that interwork with the access point.

13. The method of claim 10, wherein the authentication information is transmitted in the ANQP element.

14. The method of claim 10, wherein the wireless communication network is a non-3rdGeneration Partnership Project (3GPP) access network.

15. The method of claim 14, wherein the non-3GPP access network is a WLAN.

16. The method of claim 14, wherein the non-3GPP access network is an untrusted non-3GPP access network.

17. An apparatus for wireless communication, comprising:

a memory;

at least one processor coupled to the memory and configured to:

associate with an access point of a wireless communication network; wherein the wireless communication network is an untrusted wireless local area network (WLAN);

request, from the access point, authentication information and evolved packet data gateway (ePDG) information, wherein the authentication information and the ePDG information are requested in an access network query protocol (ANQP) request;

receive the authentication information comprising a list of networks that interwork with the access point;

receive, from the access point, the ePDG information comprising a list of networks that provide ePDGs in an area of the access point, wherein the ePDG information and the authentication information are received from the access point in a same ANQP element;

connect to the access point based on the authentication information; and select an ePDG based on the ePDG information.

18. The apparatus of claim 17, wherein the at least one processor is further configured to receive the authentication information comprising a list of networks that interwork with the access point, and wherein the authentication information is received in the ANQP element transmitted by the access point.

19. An apparatus for wireless communication, comprising:

a memory;

at least one processor coupled to the memory and configured to:

associate with a user equipment (UE);

receive a request for authentication information and evolved packet data gateway (ePDG) information, wherein the request for the authentication information and the ePDG information are received in an access network query protocol (ANQP) request;

transmit the authentication information comprising a list of networks that can authenticate with the access point;

transmit, from an access point of a wireless communication network, the ePDG information comprising a list of networks that provide ePDGs in an area of the access point, wherein the ePDG information and the authentication information are transmitted from the access point in a same ANQP element; and connect to the UE;

wherein the wireless communication network is an untrusted wireless local area network (WLAN).

20. The apparatus of claim 19, wherein the at least one processor is further configured to transmit the authentication information comprising a list of networks that interwork with the access point, and wherein the authentication information is transmitted in the ANQP element.

* * * * *